(12) United States Patent
Hofer et al.

(10) Patent No.: US 12,472,764 B2
(45) Date of Patent: Nov. 18, 2025

(54) OPTICALLY VARIABLE SECURITY ELEMENT AND VALUE DOCUMENT WITH THE OPTICALLY VARIABLE SECURITY ELEMENT

(71) Applicant: GIESECKE+DEVRIENT CURRENCY TECHNOLOGY GMBH, Munich (DE)

(72) Inventors: Moritz Hofer, Munich (DE); Christian Stockl, Gmund a. Tegernsee (DE); Matthias Blazek, Bad Wiessee (DE); Christian Fuhse, Otterfing (DE); Michael Rahm, Bad Tolz (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/567,607

(22) PCT Filed: May 24, 2022

(86) PCT No.: PCT/EP2022/025241
§ 371 (c)(1),
(2) Date: Dec. 6, 2023

(87) PCT Pub. No.: WO2022/268357
PCT Pub. Date: Dec. 29, 2022

(65) Prior Publication Data
US 2024/0262122 A1    Aug. 8, 2024

(30) Foreign Application Priority Data

Jun. 21, 2021   (DE) .................... 10 2021 003 185.7

(51) Int. Cl.
*B42D 25/324* (2014.01)
*B42D 25/328* (2014.01)

(52) U.S. Cl.
CPC ......... *B42D 25/324* (2014.10); *B42D 25/328* (2014.10)

(58) Field of Classification Search
CPC .................................................. B42D 25/324
See application file for complete search history.

(56) References Cited

U.S. PATENT DOCUMENTS

| | | |
|---|---|---|
| 9,987,873 B2 | 6/2018 | Petiton et al. |
| 10,343,443 B2 | 7/2019 | Petiton et al. |
| (Continued) | | |

FOREIGN PATENT DOCUMENTS

| | | |
|---|---|---|
| DE | 102005061749 A1 | 7/2007 |
| DE | 102010049831 A1 | 5/2012 |
| (Continued) | | |

OTHER PUBLICATIONS

German Search Report from corresponding German Application No. 10 2021 003 185.7, Mar. 11, 2022.
(Continued)

*Primary Examiner* — Kyle R Grabowski
(74) *Attorney, Agent, or Firm* — Workman Nydegger

(57) ABSTRACT

An optically variable security element has a motif region including a plurality of differently oriented first facets and a plurality of differently oriented second facets arranged in the motif region. Each of the first and second facets defines a normal vector having a first orientation component and a second orientation component. The color impression of the at least one motif is determined by the first orientation components. The representation of the at least one motif is defined by the second orientation components. The first orientation components of the first facets and the second facets are different from one another.

15 Claims, 8 Drawing Sheets

(56) References Cited

U.S. PATENT DOCUMENTS

| | | |
|---|---|---|
| 10,525,759 B2 | 1/2020 | Rahm et al. |
| 2008/0258456 A1 | 10/2008 | Rahm et al. |
| 2016/0023495 A1* | 1/2016 | Fuhse .................. B42D 25/328 |
| | | 359/566 |
| 2017/0021660 A1* | 1/2017 | Petiton ................... B42D 25/29 |
| 2017/0239972 A1 | 8/2017 | Zhang et al. |
| 2018/0244099 A1 | 8/2018 | Petiton et al. |
| 2020/0223243 A1* | 7/2020 | Petiton ................. G02B 5/1861 |
| 2020/0341174 A1* | 10/2020 | Keshavarz Akhlaghi ................... |
| | | G02B 5/0231 |
| 2021/0070091 A1* | 3/2021 | Holmes ................ B42D 25/324 |
| 2024/0121376 A1* | 4/2024 | Khoshnegar Shahrestani ............. |
| | | G02B 5/1861 |

FOREIGN PATENT DOCUMENTS

| | | |
|---|---|---|
| DE | 102014014079 A1 | 3/2016 |
| EP | 3184318 A1 | 6/2017 |
| EP | 3208099 A1 | 8/2017 |
| FR | 3019497 A1 | 10/2015 |
| WO | WO-2019180461 A1 * | 9/2019 ........... B42D 25/324 |
| WO | 2021063126 A1 | 4/2021 |

OTHER PUBLICATIONS

International Search Report from corresponding PCT Application No. PCT/EP2022/025241, Sep. 21, 2022.

\* cited by examiner

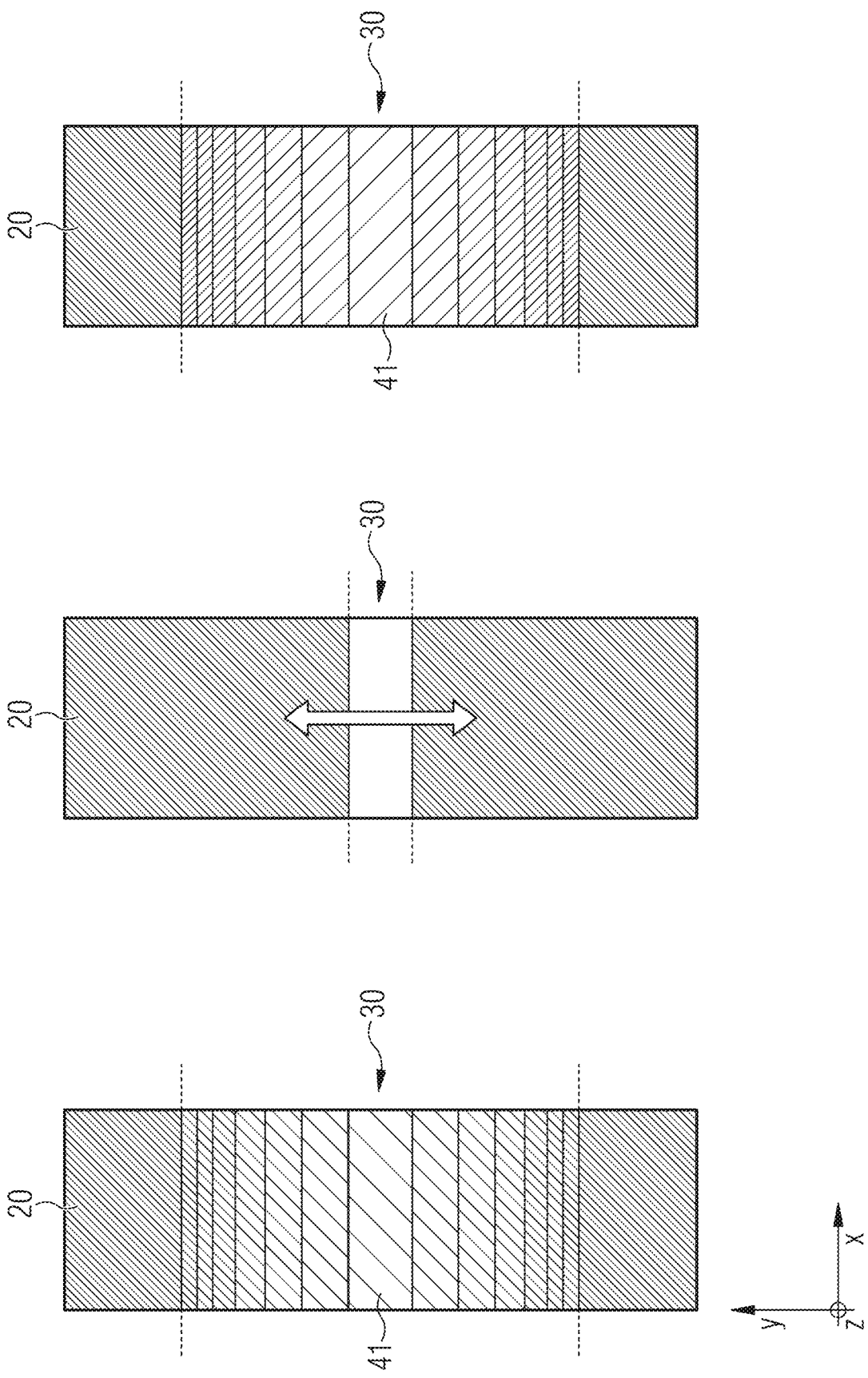

FIG. 6
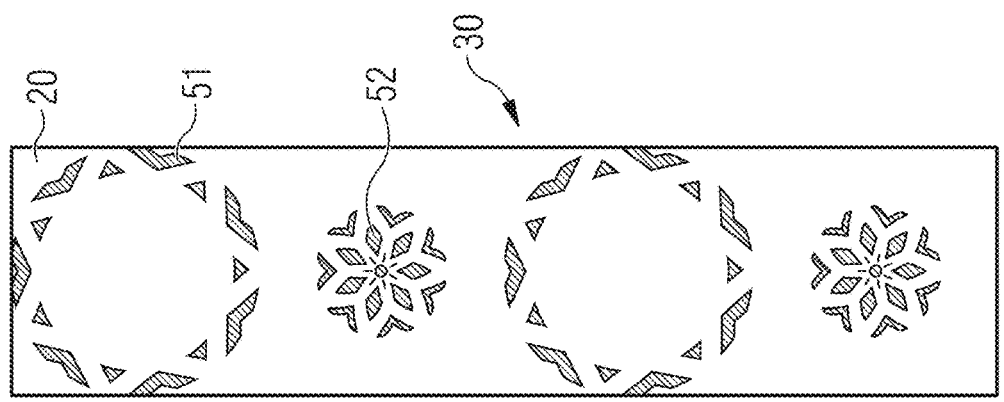
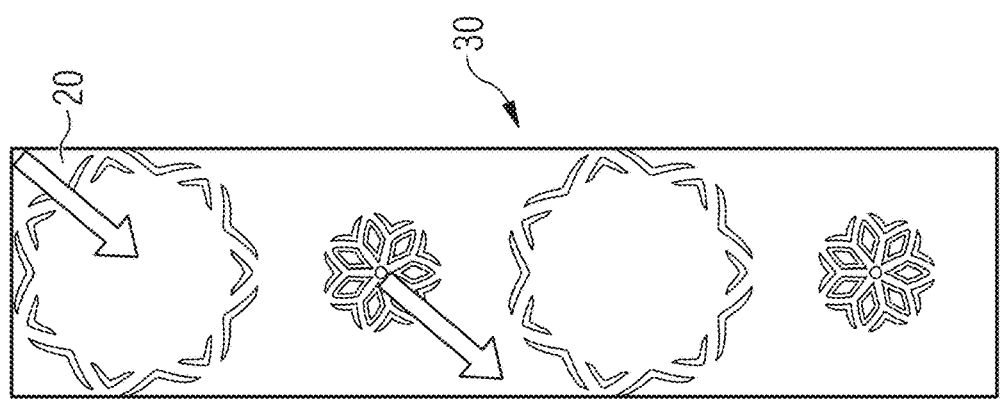
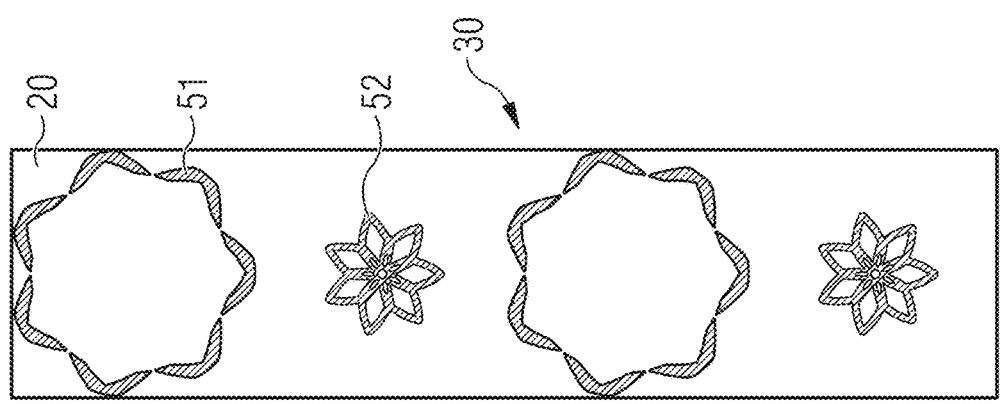

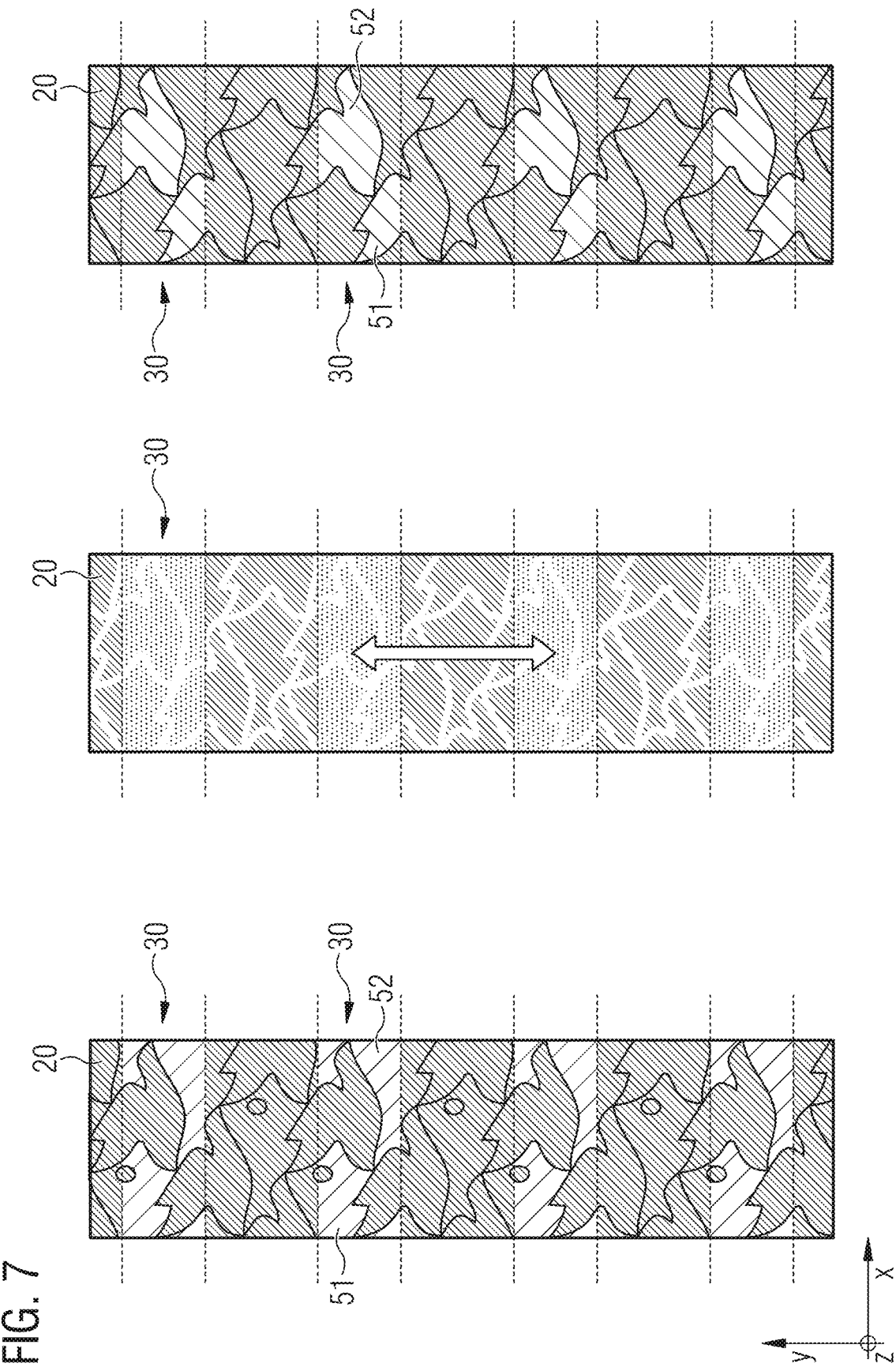

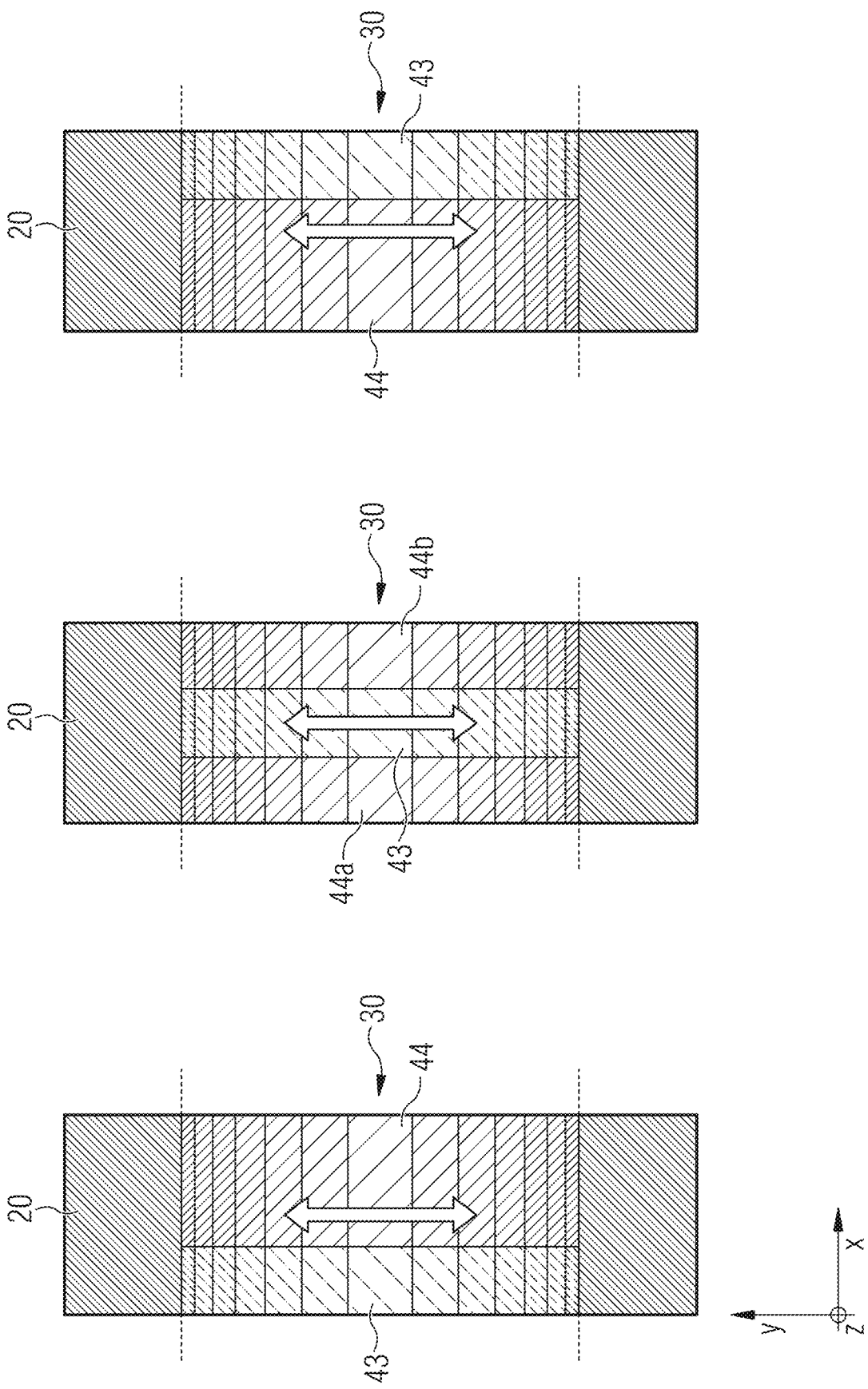

OPTICALLY VARIABLE SECURITY ELEMENT AND VALUE DOCUMENT WITH THE OPTICALLY VARIABLE SECURITY ELEMENT

TECHNICAL FIELD OF THE INVENTION

The invention relates to an optically variable security element. Furthermore, the invention relates to a value document with the optically variable security element.

TECHNICAL BACKGROUND

Optically variable security elements, for example on bank notes, are known from the prior art. Depending on the viewing angle, the observer gets different visual impressions. The different viewing angles may be achieved by tilting the optically variable element or a value document with the optically variable element about an axis, while the viewing direction of the observer and the illumination direction of the optically variable element remain unchanged.

DE 10 2014 014 079 A1 relates to an optically variable security element. The security element comprises a reflective surface region with a plurality of reflective pixels that each have identically oriented facets. The reflective surface region defines an x-y plane. At least 80% of the facets have a normal vector which lies in a y-z plane. A portion of the facets is provided with a diffractive grating pattern, wherein the grating vectors of the grating patterns lie parallel to the x-axis. A kinematic effect is generated when the security element is tilted about the x-axis, and a chromatic effect is generated when the security element is tilted about the y-axis. The chromatic effect comprises a continuous change in the color.

SUMMARY OF THE INVENTION

The object of the invention is to provide an optically variable security element which enables improved protection against forgery, and whose authenticity may be easily verified by an observer. Another object of the invention is to provide an optically variable security element which may be produced relatively easily and economically.

An optically variable security element comprises a motif region. A plurality of differently oriented first facets and a plurality of differently oriented second facets are arranged in the motif region. Each of the first and second facets defines a normal vector having a first orientation component and a second orientation component. The optically variable security element defines an x-y plane. The first facets comprise first sub-wavelength structures. The second facets comprise second sub-wavelength structures. The first sub-wavelength structures are different from the second sub-wavelength structures. In the motif region, at least one motif is visible to an observer in a depiction and with a color impression. The depiction of the at least one motif changes for the observer as the optically variable security element is tilted about a first axis. The color impression of the at least one motif changes for the observer when the optically variable security element is tilted about a second axis. The second axis is not parallel to the first axis. The color impression of the at least one motif is determined by the first orientation components. The depiction of the at least one motif is determined by the second orientation components. The first orientation components of the first facets and the second facets are different from one another.

An angle between the first axis and the second axis is preferably at least 45°, more preferably at least 80°, and more preferably between 80° and 90°. The first axis and the second axis are particularly preferably perpendicular to one another.

The first sub-wavelength structures may each generate a first color, and the second sub-wavelength structures may each generate a second color. The first sub-wavelength structures are arranged on the first facets, and the second sub-wavelength structures are arranged on the second facets. The first and second facets are tilted differently in the direction of the x-axis relative to the x-y plane. As a result, at a first viewing angle, first facets with first sub-wavelength structures may be visibly oriented toward the observer and, at a second viewing angle, second facets with second sub-wavelength structures may be visibly oriented toward the observer. As a result, different color impressions may be generated for the observer depending on the viewing angle.

The change in the color impression of the motif may be non-continuous or non-analogous. The change in color impression of the motif may be step-by-step or digital.

The motif in the motif region may be a contiguous or non-contiguous region which is brightly visible to the observer. The light region may be visible to the observer in one color such as red, green or yellow, in a color gradient or in a color pattern.

A brightly visible region shows, under the given viewing angle when there is non-diffuse illumination such as for example by the sun or a point light source, a higher relative reflected light intensity than a darkly visible, i.e. non-brightly visible, section.

The relative reflected light intensity is a ratio of reflected light intensity to radiated light intensity. If light is completely reflected from a light source, the relative reflected light intensity is 100%.

In a brightly visible region, the relative reflected light intensity may be greater by at least 5%, preferably at least 10%, more preferably at least 20%, more preferably at least 30%, more preferably at least 40%, more preferably at least 50%, than the relative reflected light intensity in a darkly visible region. The percentages may be percentage points.

The reflectance of facets in a brightly visible region is preferably substantially equal to the reflectance of facets in a darkly visible region.

The depiction of the motif may be determined at least in part by the shape, size and/or position of the motif. The depiction of the motif may be independent of the color of the motif. For example, a red square visible to the observer and a green (geometrically identical) square visible to the observer may be the same depiction of the motif, since colors preferably have no influence on the depiction of the motif.

The depiction of the motif may be defined at least partially by a submotif of the motif. For example, a circle may be visible as a submotif in a rectangular motif. If, for example, the diameter of the circle changes while the rectangular motif does not change, the depiction of the motif changes.

The color impression of the motif may be the impression of the color or the color scheme of the motif which is conveyed to an observer. A color scheme may be caused by several regions of different colors. The impression of the color or the color scheme of the motif may be perceptible by an average human (observer). The color impression is dependent on the viewing angle of the observer.

The color impression of the motif (depending on the viewing angle) may be defined by the sub-wavelength structures and the arrangement of facets with the sub-wavelength structures.

In general, a color impression is caused by electromagnetic radiation having a wavelength between 380 nm and 780 nm. This range of the electromagnetic radiation is perceptible by the human eye and is referred to as (visible) light.

By tilting the security element about the first axis, the depiction of the motif changes. For example, a kinematic effect is visible to the observer by tilting the security element about the first axis. With the kinematic effect, a movement that appears continuous may be visible to the observer in at least one section of the motif region. With the kinematic effect, a change in the position, the size and/or the shape of the motif may be visible to the observer depending on the viewing angle.

The change in the depiction may be visible to the observer over at least 50% of the area of the motif region, preferably over at least 70% of the area of the motif region, more preferably over at least 90% of the area of the motif region, and more preferably over the entire area of the motif region.

The observer may accordingly recognize a change in the depiction of the motif or a change in the color impression of the motif depending on the axis of the tilting of the security element. In a preferred embodiment, the observer may recognize a change in the depiction of the motif and a change in the color impression of the motif if the security element is tilted about an axis. This is particularly striking for the observer, which allows him to easily check the authenticity of the security element.

The depiction of the at least one motif may comprise a size, a position and/or a shape of the at least one motif, or may be defined by a size, a position and/or a shape of the at least one motif. A change in the depiction of the at least one motif may be visible to the observer by changing the size, the position and/or the shape of the at least one motif.

In general, security elements may be applied to an object in order to enable the verification of the authenticity of the object. Such an object may be, for example, a check, a bank card, a document, a certificate, an identification document, an item of clothing (a label of a piece of clothing), a value document or a bank note.

The security element may convey a visual impression to an observer (a human) without aids, so that the observer may visually perceive the authenticity of the object provided with the security element without aids. An optical security element is particularly suitable for simple or everyday authenticity checks by a human. The visual impression may be perceptible in a wavelength range from 400 nm to 780 nm.

With an optically variable security element, different visual impressions result for the observer who would like to perform an authenticity check depending on the viewing angle, the viewing direction, the side of the security element or the type of viewing (viewing the top or through). Accordingly, the security element may convey a first visual impression at a first viewing angle, and may convey a second visual impression at a second viewing angle, wherein the first visual impression and the second visual impression are different.

The security element may be applied to the object to be secured, e.g. a banknote or a precursor of a banknote, for example as a patch or strips. The security element may be flat. The area of the security element may at most 5,000 mm$^2$, preferably at most 2,500 mm$^2$, more preferably at most 1,500 mm$^2$, and more preferably at most 1,000 mm$^2$.

The security element may have an at least five-fold, preferably at least ten-fold, greater length than width. The security element may have a width of at least 1 mm.

The security element may be provided as a thread, as a strip or as a patch.

A security paper may be a precursor of a value document. A security paper may be a not yet completely printed paper. A security paper may comprise at least one security element, at least one window and/or at least one security feature.

The security element may be applied to a value document or a security paper. The security element may extend from one side of the value document or the security paper to another side of the value document or the security paper. The sides may be opposite sides. The security element may have a length that is equal to the width or height of the value document or the security paper.

The security element may be incorporated at least partially in the value document or in the security paper. The security element may accordingly be incorporated in the value document or the security paper such that sections of the security element are visible to an observer, and sections of the security element are not visible to the observer. The security element may accordingly be incorporated in the value document or the security paper such that sections of the security element are covered by the value document or the security paper, and sections of the security element are not covered by the value document or the security paper.

A sub-wavelength structure may generally be a structure whose dimensions or period is smaller than the wavelength of the light, in particular less than or equal to about 400 nm. Additionally or alternatively, the dimensions or the period are at least 50 nm, more preferably at least 100 nm. The sub-wave structures have a color effect, i.e. light impinging on the sub-wavelength structure is changed by the sub-wavelength structure. For example, the sub-wavelength structure manifests a color filtering property. The sub-wavelength structure may be a reflective or transmissive structure. In reflection and/or transmission, the security element may provide the change in the color impression when the security element is tilted about the second axis.

The first sub-wavelength structures may be designed to generate a first color. The second sub-wavelength structures may be designed to generate a second color. The first color and the second color may differ.

More than two different sub-wavelength structures may be arranged on different facets in the motif region. Each of the sub-wavelength structures may be designed to generate a different color.

The color effect of the sub-wavelength structures may be substantially independent of tilting the optically variable security element about the first axis and/or about the second axis. The color effect of the sub-wavelength structures may substantially not change or remain substantially the same when the security element is tilted about the first axis or about the second axis. The color effect of the sub-wavelength structures may be substantially tilt-invariant. This substantially allows a deviation of ±10% or ±5%. A tilt-invariant sub-wavelength structure in the color effect may be used in particular on facets with any angle of inclination/first (or second) orientation component, since they always produce the same color effect.

In addition, the sub-wavelength structure may preferably be designed such that its color effect is rotationally invariant. In a theoretical rotation about a plane of the sub-wavelength structure, i.e., for example, about a plane of the facet with a sub-wavelength structure, or about the plane of the security element if the sub-wavelength structure were arranged parallel to the plane of the security element, the color effect does not change. A sub-wavelength structure with a rotationally invariant color effect may accordingly be used on facets with any azimuth angle/second (or first) orientation component, since they always produce the same color effect. Particularly preferably, the sub-wavelength structure is tilt-invariant and rotation-invariant, and may accordingly be used on facets with any orientation (inclination and/or azimuth angle or first and/or second orientation component).

The facets comprise the sub-wavelength structures. Each of the facets may comprise a sub-wavelength structure. One of the sub-wavelength structures may each be arranged on one of the facets. Each of the facets may comprise more than one equivalent sub-wavelength structure. At least some of the facets may comprise at least two sub-wavelength structures of different types. Different types of sub-wavelength structures may have a different color effect.

The sub-wavelength structures may be periodic structures. The sub-wavelength structures may be formed periodically or arranged periodically. The period may be between 100 nm and 500 nm, preferably between 200 nm and 400 nm. Different sub-wavelength structures may differ by different periods. Different periods of the sub-wavelength structures may cause different color effects.

The sub-wavelength structures may have a height or depth between 50 nm and 400 nm, preferably between 100 nm and 300 nm. The depth may be next to an elevation or between two elevations. The height and/or the depth may be understood as an extension in the direction of the normal vector of the facet. Different heights and/or depths of the sub-wavelength structures may cause different color effects.

The sub-wavelength structures may be one-dimensional gratings. The one-dimensional gratings may have a polarizing effect. One-dimensional gratings may have substantially parallel grating webs. Recesses may be present between the grating webs. The one-dimensional grating may have a grating period between 100 nm and 500 nm, and preferably between 200 nm and 400 nm. The period may be a distance between adjacent grating webs.

The sub-wavelength structures may be two-dimensional gratings. Two-dimensional gratings may have substantially parallel first grating webs and substantially parallel second grating webs. The first grating webs may be non-parallel, in particular perpendicular, to the second grating webs. The two-dimensional grating has recesses between the grating webs. The recesses may have a rectangular, square, hexagonal or parallelogram shape, in particular parallel to the x-y plane. At least one of the grating periods of the two-dimensional grating, preferably two grating periods of the two-dimensional grating, may be between 100 nm and 500 nm, preferably between 200 nm and 400 nm.

The sub-wavelength structures may be wave-shaped, in particular sinusoidal, sawtooth-shaped, rectangular or z-shaped in a cross-section. The sub-wavelength structures may have high-lying and low-lying sections in a cross-section, in particular alternating high-lying and low-lying sections. The high-lying and/or low-lying sections may be flat. The sub-wavelength structures may have concave and/or convex sections, in particular alternately concave and convex sections, in a cross-section. The concave and/or convex sections may be curved or arched at least sectionally. The cross-section may be oriented perpendicular to the x-y plane.

The sub-wavelength structures may comprise or be an arrangement of nanoholes. The sub-wavelength structures may comprise or may be an array of nanodots. The arrangement may be periodic or aperiodic. Different heights and/or depths of the nanodots or nanoholes may cause different color effects.

The sub-wavelength structures may be irregularly arranged structures. Preferably, the sub-wavelength structures are randomly distributed or quasi-periodically arranged structures.

The structures may be characterized by the outline shape, the depth and/or the profile shape.

The sub-wavelength structures may be concave-convex structures, in particular in a cross-section perpendicular to the x-y plane of the security element. The concave-convex structures may be distributed irregularly. The concave-convex structures may have flat sections.

The sub-wavelength structures may be formed in an embossed layer. The embossed layer may be a film, preferably a thermoplastic film. The embossed layer may be a radiation-curable or radiation-cured varnish, in particular a UV radiation-curable or UV radiation-cured varnish.

The sub-wavelength structures may comprise a metal layer. The sub-wavelength structures may comprise an Al, Ag, Cr, Cu or Fe layer. The sub-wavelength structures may comprise a layer of an Al, Ag, Cr, Cu or Fe alloy. The sub-wavelength structures may be metalized with the metal layer.

The sub-wavelength structures may comprise an HRI layer (HRI: high refractive index). The HRI layer may have a refractive index of at least 1.6, preferably at least 1.8, or particularly preferably more than 2.0. The HRI layer may be a ZnS layer or comprise ZnS.

The sub-wavelength structures may comprise a multi-layered layer. The multi-layered layer may comprise an absorber layer, a dielectric layer and a reflective layer, preferably in this sequence. The multi-layered layer may comprise an absorber layer, a dielectric layer and an absorber layer, in particular in this sequence.

The sub-wavelength structures may be embedded in a layer. Preferably, the sub-wavelength structures are embedded in a varnish layer.

The sub-wavelength structures may comprise a continuous layer. The continuous layer may comprise high and low sections, in particular in a cross-section perpendicular to the x-y plane. The high and low sections may comprise a layer.

The sub-wavelength structures may comprise a non-continuous or interrupted layer. The non-continuous or interrupted layer may be continuous in a view perpendicular to the x-y plane. The non-continuous or interrupted layer may comprise sections that are spaced apart in a direction perpendicular to the x-y plane. The sections may be adjacent or superimposed in a direction parallel to the x-y plane.

At least some of the first and second facets, preferably a majority of the first and second facets, of the security element may be tilted relative to the x-y plane in the direction of the first axis. All of the first and second facets of the security element may be tilted relative to the x-y plane in the direction of the first axis. Between the first and second facets, which are tilted relative to the x-y plane in the direction of the first axis, and the x-y plane, an angle between −60° and 60° (preferably excluding 0°), preferably between −45° and 45° (preferably excluding 0°), may be formed in each case. The angle may be formed in the direction of the first axis between the first and second facets, which are tilted relative to the x-y plane in the direction of the first axis, and the x-y plane.

The angle of a facet which is parallel to the x-y plane is 0°. A facet with a positive angle (for example between 1° and 89°) may be tilted in the positive direction relative to the x-y plane. The normal vector of a facet with a positive angle may have a positive first orientation component. A facet with a negative angle (for example between −89° and −1°) may be tilted in the negative direction relative to the x-y plane. The normal vector of a facet with a negative angle may have a negative first orientation component.

The first facets may be tilted differently relative to the x-y plane in the direction of the first axis than the second facets. In particular, the first facets may be tilted relative to the x-y plane in the direction of the first axis within a first angular range. The second facets may be tilted relative to the x-y plane in the direction of the first axis within a second angular range. The first angular range and the second angular range may be different; preferably the first angular range and the second angular range do not overlap.

The first angular range and/or the second angular range may comprise a range of at least 1°, preferably at least 3°, more preferably at least 5°, more preferably at least 10°, and more preferably at least 20°. For example, the first facets may be tilted between −15° and 0° relative to the x-y plane in the direction of the first axis, and the second facets may be tilted between 0° and 15° relative to the x-y plane in the direction of the first axis.

At least some of the first and second facets, preferably a majority of the first and second facets, of the security element may be tilted relative to the x-y plane in at least two directions. All of the first and second facets of the security element may be tilted relative to the x-y plane in at least two directions. Preferably, the first direction is oriented in the direction of the first axis. In particular, the second direction is oriented in the direction of the second axis.

The color impression of the at least one motif may be constant for the observer as the optically variable security element is tilted about the second axis.

In particular, the color impression of the at least one motif is constant for the observer as the optically variable security element is tilted about the second axis within a tilt angle range.

The tilt angle range may comprise a range of at most 90°, preferably at most 80°, more preferably at most 70°, more preferably at most 60°, more preferably at most 50°, more preferably at most 40°, more preferably at most 30°, more preferably at most 20°, and more preferably at most 10°.

When the security element is tilted about the second axis, a color flip effect (coloring jump effect) in the motif region may be visible to the observer. An abrupt or discontinuous transition from a color impression to another color impression may be referred to as a color flip effect or color jump effect.

With a color flip effect, a substantially identical color impression of at least a section of the motif region may result for the observer when the security element is tilted about the second axis in a first viewing angle range. With a color-flip effect, a visual impression of at least one section of the motif region may not substantially change for the observer when the security element is tilted about the second axis in a first viewing angle range.

When the security element is tilted beyond a limit viewing angle, the color impression in the section of the motif region may change, in particular change abruptly or discontinuously.

The changed color impression in the section of the motif region may be visible to the observer consistently or unchanged when the security element is tilted further about the second axis in a second viewing angle range.

The limit viewing angle may lie between the first viewing angle range and the second viewing angle range.

Preferably in a viewing angle range of 180°, at most 20, more preferably at most 15, more preferably at most 10, more preferably at most 5, more preferably at most 2 changes of the color impression of at least one section of the motif region are visible to the observer.

In a viewing angle range of 180°, at least 2, preferably at least 3, more preferably at least 5, more preferably at least 10, more preferably at least 15, more preferably at least 20, changes in the color impression of at least one section of the motif region may be visible.

The depiction of the at least one motif may be constant or may not change for the observer as the optically variable security element is tilted about the second axis, preferably as the optically variable security element is tilted about the second axis within a first viewing angle range. Alternatively or additionally, the color impression of the at least one motif may be constant or may not change for the observer as the optically variable security element is tilted about the first axis, preferably as the optically variable security element is tilted about the first axis within a second viewing angle range.

For the observer, the depiction of the at least one motif may be independent of tilting the security element about the second axis. Alternatively or additionally, for the observer, the color impression of the at least one motif may be independent of tilting the security element about the first axis.

As the optically variable security element is tilted within a first viewing angle range about the second axis, the color impression of the at least one motif may change. As the optically variable security element is tilted within the first viewing angle range, the depiction of the at least one motif may be substantially constant.

Alternatively or additionally, as the optically variable security element is tilted within a second viewing angle range about the first axis, the depiction of the at least one motif may change. As the optically variable security element is tilted within the second viewing angle range about the first axis, the color impression of the at least one motif may be substantially constant.

The first and second facets may be nested or not nested in one another.

If the first and second facets are nested in one another in one section, neither just the visual impression caused by the first facets nor just the visual impression caused by the second facets may be visible to the observer in the section. In this case, at least some of the first and second facets may be arranged directly adjacent to one another.

If the first and second facets are not nested in one another in one section, either (exclusively) the first or (exclusively) second facets may be arranged in the section. In this case, the visual impression of the section may be caused either by the first facets or by the second facets for the observer.

The section may be a section that is resolvable by the observer (without an aid), in particular a pixel.

The first and second facets may be arranged in the motif region such that at least one section of the at least one motif is visible to the observer in one color. The color may be a color that is caused by a sub-wavelength structure.

The section may have a dimension of at least 300 μm, in particular at least 500 μm. A dimension may be a width or a length of the section. The dimension may be oriented parallel to the x-y plane. The section preferably has an area of at least 0.09 mm$^2$, preferably at least 0.25 mm$^2$.

Between the section and a section (directly) adjacent thereto, a transition of the color impression or of the color may be abrupt, sudden and/or discontinuous.

At least a section of the at least one motif may be visible at a first viewing angle in a first color. The section of the at least one motif may be visible at a second viewing angle in a second color.

The section may be an area of at least 0.09 mm². The section preferably has an area of at least 0.25 mm², more preferably of at least 1 mm², more preferably of at least 4 mm², more preferably of at least 9 mm², more preferably of at least 16 mm², and more preferably of at least 25 mm².

The first color may be caused by first facets having first sub-wavelength structures. The second color may be caused by second facets having second sub-wavelength structures.

A transition from the first viewing angle to the second viewing angle may be carried out by tilting the security element about the second axis.

Preferably, the at least one motif is visible completely in the first color by the observer at the first viewing angle. The at least one motif may be visible completely in the second color by the observer at the second viewing angle.

In at least one section of the at least one motif, a first color gradient may be visible to the observer at a first viewing angle. In the section of the at least one motif, a second color gradient may be visible at a second viewing angle. The first color gradient and the second color gradient may be different color gradients.

In a color gradient, individual sections with a same color may not be resolved or not differentiated by an observer. In a color gradient, sections with a same color may be present, wherein the dimension of the sections is of a size which is not resolvable by an observer or distinguishable from another section.

Each of the color gradients may be visible to the observer as a continuous (non-sudden) transition of colors.

The at least one motif may comprise at least a first subregion and at least one second subregion. The first subregion may be visible to the observer at a first viewing angle in a first color impression. The second subregion may be visible to the observer at the first viewing angle in a second color impression. The first subregion may be visible to the observer at a second viewing angle in the second color impression. The second subregion may be visible to the observer at the second viewing angle in the first color impression. The first color impression may be a first color, and/or the second color impression may be a second color.

The first subregion of the at least one motif may be visible at the first viewing angle by the observer in a first color impression. The second subregion of the at least one motif may be visible at the first viewing angle by the observer in a second color impression. At the second viewing angle, the first subregion may be visible to the observer in a third color impression. The second subregion may be visible at the second viewing angle in a fourth color impression. The first, second, third and fourth color impression may be different color impressions. The first, second, third and/or fourth color impression may each be one color.

A transition from the first viewing angle to the second viewing angle may be carried out by tilting the security element about the second axis.

Each of the subregions may be an area of at least 0.09 mm². Preferably, each of the subregions has an area of at least 0.25 mm², more preferably of at least 1 mm², more preferably of at least 4 mm², more preferably of at least 9 mm², more preferably of at least 16 mm², and more preferably of at least 25 mm².

In the at least one motif, at least one submotif may be visible to the observer. As the optically variable security element is tilted about the first axis, the submotif may change for the observer. As the optically variable security element is tilted about the first axis, the size, the shape and/or the position of the at least one submotif are preferably changed for the observer. When a submotif changes, the display of the at least one motif changes for the observer.

The submotif may have a motif shape visible to the observer. The motif shape is, for example, a circle, a quadrilateral, an apple, a flower, a face or a value number. The motif shape may be the shape of a geometric figure. In particular, the motif shape is a circle or a polygon. The polygon may be a triangle, a quadrilateral, in particular a rectangle, a diamond or a square, or a hexagon.

As the optically variable security element is tilted about the first axis, a movement effect of the submotif may be visible to the observer. The movement effect may be a change in size, for example a pumping effect, a change in the position of the submotif in the motif region, and/or a change in the shape of the motif.

In a pumping effect, by tilting the optically variable security element about the first axis, the submotif may be visible to the observer alternatively larger and smaller.

The size of the submotif preferably increases when the security element is tilted in a first direction about the first axis, and the size of the motif decreases when the security element is tilted in a second direction. The first direction may be opposite the second direction.

When the security element is tilted in one direction, the size of the submotif may alternately decrease and increase, or increase and decrease.

In the motif, at least two, preferably at least, preferably at least four, submotifs may be visible to the observer. A movement effect may be visible to the observer when the security element is tilted about the first axis for each of the submotifs. This may be the same for a part of the submotifs, in particular for all submotifs. I.e., a part of the submotifs or all submotifs show the same movement effect when the security element is tilted about the first axis.

The color impression and the depiction of the at least one motif may change for the observer as the optically variable security element is tilted about the second axis. When the security element is tilted about the first axis, the color impression of the motif may not change, or the color impression of the motif may remain the same.

Preferably, at least one first submotif is visible to the observer in the at least one motif. As the optically variable security element is tilted about the second axis, the color impression of the submotif and/or the shape of the submotif may change for the observer. The submotif may be any submotif disclosed herein. The color impression may be a color.

A transition from the first viewing angle to the second viewing angle may be carried out by tilting the security element about the second axis.

At the first viewing angle, the at least one submotif may be different from the at least one submotif at the third viewing angle. The size, the position and/or the shape of the submotif may differ between the first viewing angle and the second viewing angle.

In the motif region, at least two, preferably at least three, more preferably at least four motifs may be visible to the observer. Each of the motifs may be the same. At least some of the motifs, preferably all of the motifs, may be different.

The at least one motif may comprise at least a first subregion. The first subregion may be visible to the observer in a first color impression. The at least one motif may comprise at least a second subregion. The second subregion may be visible to the observer in a second color impression.

As the optically variable security element is tilted about the second axis, a change in the first subregion and/or the second subregion may be visible to the observer. The second subregion is optional. The first color impression may be a first color, and/or the second color impression may be a second color.

The change may be a change in the size, the shape, and/or the position of the first subregion. Alternatively or additionally, the change may be a change in the size, the shape and/or the position of the second subregion.

When the security element is tilted about the second axis, the position of the first subregion preferably changes relative to the second subregion. When the security element is tilted about the second axis, the observer may perceive a movement of the first subregion relative to the second subregion. The color impression of the first subregion and/or of the second subregion may not change during the movement.

The first subregion may be visible to the observer within a first tilt angle range at a first position. Within a second tilt angle range, the first subregion may be visible to the observer at a second position. Within a third tilt angle range, the first subregion may be visible to the observer at a third position. At least three, preferably at least five, more preferably at least ten, more preferably at least 15, more preferably at least 20, tilt angle ranges may be provided. Within a respective tilt angle range, the position of the first subregion may not change for the observer. Between different tilt angle ranges, the position of the first subregion may change for the observer.

The facets may be directionally reflective facets. The facets are preferably non-diffractive facets.

The facets may be surfaces of microreflectors. One surface of a microreflector may be a facet. The microreflectors may be micromirrors. The microreflectors are preferably micromirrors that each have an inclined facet in each case.

The microreflectors, in particular the micromirrors, may be designed as described in DE 10 2005 061 749 A1. The microreflectors, in particular the micromirrors, may be produced or manufactured as described in DE 10 2005 061 749 A1.

The security element may comprise an arrangement of facets, in particular of microreflectors with the facets. The arrangement of facets may comprise a relief structure with a reflection-enhancing coating. The arrangement of facets may comprise a relief structure with a metal coating. The arrangement of facets may comprise an embossed embossing varnish layer.

A dimension of each of the facets, in particular a maximum width of each of the facets, may be between 2 µm and 300 µm, preferably between 3 µm and 100 µm, more preferably between 5 µm and 50 µm.

The facets are inclined or tilted (angled) relative to a plane defined by the security element (x-y plane). As a result, light from a light source may be reflected at different strengths to a point by different facets which are inclined differently relative to the plane. By suitably selecting the tilt of different facets, a motif may be visible to an observer by a reflection of light. Specifically, different visual impressions may be visible to the observer depending on the viewing angle.

Facets may, for example, be formed or are formed by an embossing method in an embossable layer, for example in an embossing varnish layer. The embossable layer may be applied or is applied to a substrate. The embossable layer may be a film, in particular a thermoplastic film. The embossable layer may be a radiation-curable varnish. The embossable layer may have a plurality of partial layers.

A value document may comprise any of the security elements disclosed herein. The value document may be a check, a bank card, a document, a certificate, an identity card, an item of clothing (a label of a piece of clothing) or a banknote.

The value document may comprise at least one further security element. The further security element may be a security element perceptible to an observer. The further security element may be a security element that may not be perceptible by an observer. The further security element may be a security element perceptible by a machine.

The value document may comprise at least one security feature. The security feature may be printed onto the value document. The security feature may be incorporated into a substrate of the value document. The security feature may be a security feature perceptible to an observer. The security feature may be a security feature that may be imperceptible by an observer. The security feature may be a security feature that may be perceptible by a machine.

BRIEF DESCRIPTION OF THE FIGURES

The invention and further embodiments and advantages of the invention will be explained in more detail below with reference to figures, wherein the figures merely describe exemplary embodiments of the invention. Identical components in the figures are provided with the same reference numbers. The figures are not to be considered true to scale; individual elements of the figures may be illustrated excessively large or excessively simplified.

FIG. 2 shows on the left a motif region 20 with a motif 30 at a first viewing angle, on the right the motif region 20 with the motif 30 at a second viewing angle, and in the middle, a change of the motif 30 is indicated when the security element 10 is tilted about the first axis;

FIG. 6 shows on the left a motif region 20 with a motif 30 at a first viewing angle, on the right the motif region 20 with the motif 30 at a second viewing angle, and in the middle, a change of the motif 30 is indicated when the security element 10 is tilted about the first axis;

FIG. 7 shows on the left a motif region 20 with a motif 30 at a first viewing angle, on the right the motif region 20 with the motif 30 at a second viewing angle, and in the middle, a change of the motif 30 is indicated when the security element 10 is tilted about the first axis; and FIG. 8 shows on the left a motif region 20 with a motif 30 at a first viewing angle, in the middle the motif region 20 with the motif 30 at a second viewing angle, and on the right the motif region 20 with the motif 30 at a third viewing angle.

DETAILED DESCRIPTION OF VARIOUS EMBODIMENTS

Figure 1:
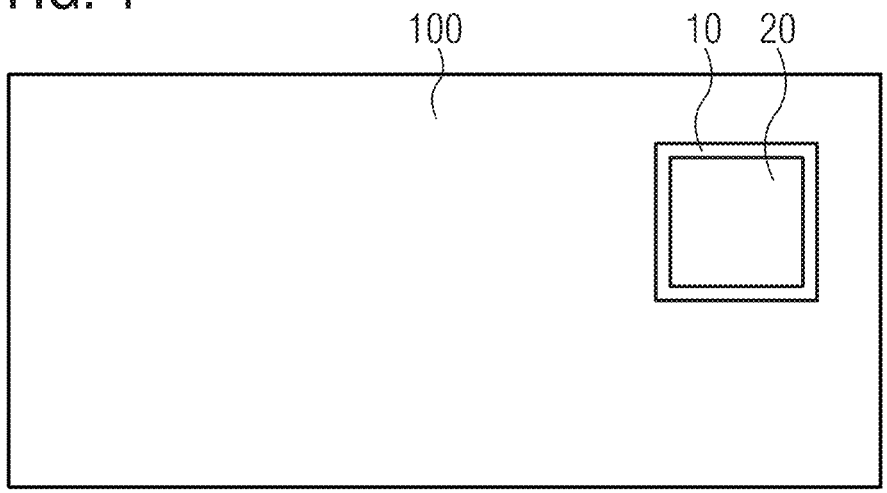
FIG. 1 shows a security element 100 with a security element 10 and a motif region 20.

FIG. 1 shows a value document 100 with a security element 10. The security element 10 comprises at least one motif region 20. A motif 30 is visible to an observer in the motif region 20.

The security element 10 defines an x-y plane. The x-direction may be understood as the first axis, and the y-direction may be understood as the second axis. The first and second axes lie in the x-y plane. The first axis and the second axis are non-parallel. An angle between the first axis and the second axis is preferably at least 45°; particularly preferably the first axis and the second axis are oriented perpendicular to one another. A z-direction may extend from the x-y plane. Preferably, the z-direction is oriented perpendicular to the x-y plane.

The value document 100 is, for example, a bank note. A carrier or substrate of the value document 100 may comprise or consist of one or more paper layers. The carrier or the substrate of the value document 100 may alternatively comprise or consist of one or more plastic layers. Further alternatively, the carrier or the substrate of the value document 100 may comprise at least one paper layer and at least one plastic layer.

The security element 10 may be applied to the carrier (or the substrate) of the value document 100, for example as security strips or safety patches. As a rule, the security elements are provided on a transfer carrier, for example a plastic film, and then (released and) transferred from the transfer carrier to the carrier of the value document. Alternatively, the security element is introduced into the carrier of the value document, for example as a security thread. The security element may in particular already be introduced into the carrier during the production of the carrier, for example during the production of paper or film or between two partial layers of the carrier.

On the left, FIG. 2 shows a motif region 20 of a security element 10 at a first viewing angle. On the right in FIG. 2, the motif region 20 of the security element 10 is shown at a second viewing angle. A transition from the first viewing angle to the second viewing angle may take place by tilting the security element 10 about the second axis (y axis or y direction).

The illustration in the middle of FIG. 2 illustrates a change in motif 30 when the security element 10 is tilted about the first axis (x-axis or x-direction), for example from the first viewing angle to a third viewing angle or from the second viewing angle to a fourth viewing angle.

A motif 30 is visible to the observer in the motif region 20. The motif 30 is visible to the observer in a depiction and with a color impression. FIG. 2 shows the motif 30 between two dashed lines for better recognition. Different densities of the hatching may indicate differently bright regions, wherein a transition between the differently bright regions may be continuous.

At the first viewing angle, the depiction of the motif 30 may be a brightly illuminated section 41 in the motif region 20. In the example of FIG. 1, the section 41 is strip-shaped or rectangular. The motif 30 may extend from one side of the motif region 20 to an opposite side of the motif region 20. Alternatively, the section 41 may be circular or square or have another shape, in particular a geometric shape.

The motif 30 is visible to the observer with a color impression. The color impression may be single-colored. In this case, the observer may see the motif 30 at the first viewing angle in (exactly) one color. The color is, for example, green, red, blue or turquoise.

The color impression may be multi-colored. An observer may see the motif 30 with more than one color, for example with a blue and a red section. A mixed color may also be visible to the observer. Facets with different sub-wavelength structures that generate different basic colors (e.g. red and green) may be arranged such that the observer receives a yellow color impression.

The brightly illuminated section 41 of the example of FIG. 2 is brightly illuminated at the first viewing angle in a first color (color impression of the motif 30) and is strip-shaped or rectangular at a position (depiction of the motif 30) in the motif region 20.

By tilting the security element 10 about the second axis, the color impression of the motif 30 changes for the observer. At the second viewing angle, the motif 30 is visible to the observer with a different color impression than at the first viewing angle.

When the security element 10 is tilted about the second axis, the depiction of the motif 30 may not change. In other words, the depiction of the motif 30 at the first viewing angle and the second viewing angle may be the same.

The color impression of the motif 30 may be single-colored or multi-colored at the second viewing angle. In the example of FIG. 2, the motif 30 is visible to the observer as a strip-shaped or rectangular section 41 brightly illuminated in a second color at the same position as at the first viewing angle.

The first viewing angle is preferably within a first angular range (also referred to as a tilt angle range). The second viewing angle may lie within a second angular range. When the security element is tilted within an angular range, the color impression of the motif 30 may not change or may remain the same.

For example, the first angular range and the second angular range may each comprise 10°. The security element 10 may be tilted within the respective angular range by up to 10° without changing the color impression for the observer.

A limit angle may lie between the first angular range and the second angular range. If the limit angle is exceeded, i.e. the security element is tilted across the limit angle, the color impression of the motif 30 may change. The change in the color impression of the motif 30 may be perceptible by the observer abruptly, suddenly and/or discontinuously. A color flip effect may be visible by the observer when the safety element 10 is tilted about the second axis.

When the security element 10 is tilted about the first axis (x-axis or x-direction), the depiction of the motif 30 changes. In this case, the position, the shape and/or the size of the motif 30 may change. The change in the depiction of the motif 30 may be perceived as continuous by the observer.

Preferably, when the security element 10 is tilted about the first axis, the position of the motif 30 changes. For example, the motif 30 (depending on the tilting direction) may be visible to the observer as moving up or down, wherein in particular the shape and/or the size of the motif 30 does not change. Likewise, sections of the motif 30 (depending on the tilting direction) may be visible to the observer as moving toward or away from one another, wherein in particular the shapes and/or sizes of the sections of the motif 30 do not change.

Preferably, when the security element 10 is tilted about the first axis, the shape of the motif 30 changes. The motif 30 may be visible to the observer (depending on the tilting direction) with different shapes. The motif 30 may be visible to the observer at the first viewing angle and at the second viewing angle in each case in a first shape, for example as a quadrilateral. When the security element is tilted about the first axis, the shape of the motif 30 may change, for example from the quadrilateral to a triangle.

More preferably, when the security element 10 is tilted about the first axis, the size of the motif 30 changes. The motif 30 may be visible (depending on the tilting direction) to the observer as larger or smaller, wherein in particular the shape of the motif 30 does not change. For example, the motif 30 may be a circular area both at the first viewing angle and at the second viewing angle. The size of the surface may change when the security element is tilted about the first axis. Depending on the direction of tilting, the surface may be visible larger or smaller to the observer.

In the example of FIG. 2, a position of the motif 30 changes as a brightly illuminating section 41. By tilting the security element 10 about the first axis, the motif moves in the motif region 20 for the observer. This is indicated in FIG. 2 by the double arrow in the middle image. The double arrow is not visible in the motif region 20; it serves merely for illustration.

At the first viewing angle, the motif 30 is visible to the observer in a first depiction with a first color impression. At the second viewing angle, the motif 30 is visible to the observer in the first depiction with a second color impression. The transition from the first viewing angle to the second viewing angle may be executable by tilting the security element 10 about the second axis.

Starting from the first viewing angle, the security element may be tilted about the first axis to a third viewing angle. At the third viewing angle, the motif 30 may be visible to the observer in a second depiction with the first color impression. This tilting may therefore change the depiction, and the color impression remains the same.

Starting from the second viewing angle, the security element may be tilted about the first axis to a fourth viewing angle. At the fourth viewing angle, the motif 30 may be visible to the observer in the second depiction with the second color impression. During this tilting, the depiction of the motif 30 may change and the color impression remains the same.

A transition from the third viewing angle to the fourth viewing angle or from the fourth viewing angle to the third viewing angle may be carried out by tilting the security element 10 about the second axis. The color impression of the motif 30 may change and the depiction of the motif remains the same.

Figure 3A:
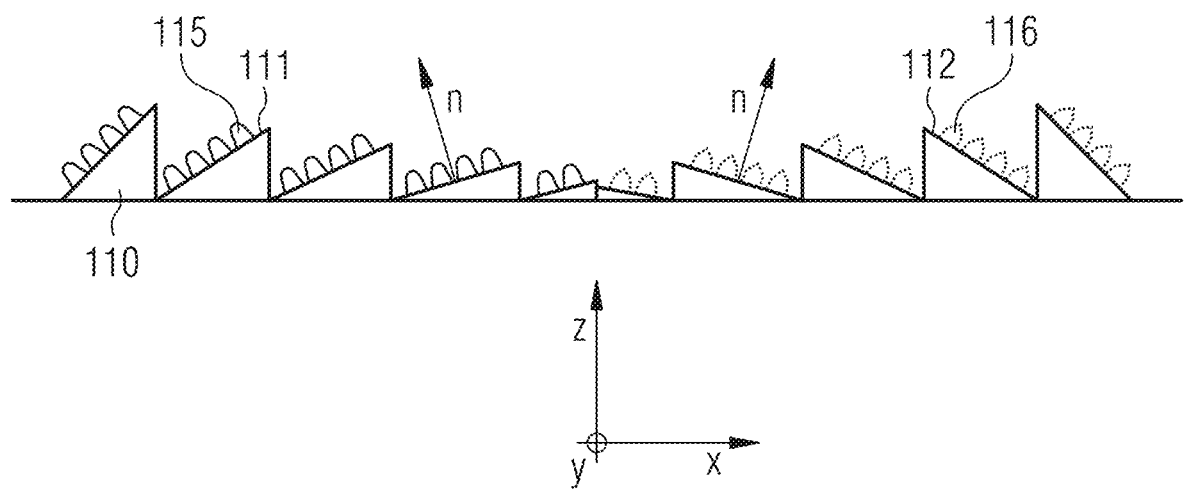
FIG. 3a shows an arrangement of first facets 111 and second facets 112.

FIG. 3a schematically shows a first arrangement of facets 111, 112 in a motif region 20 and 3b, and schematically shows a second arrangement of facets 111, 112 in a motif region 20.

The motif region 20 comprises a plurality of differently oriented first facets 111 and a plurality of differently oriented second facets 112. The first facets 111 comprise first sub-wavelength structures 115, and the second facets 112 comprise second sub-wavelength structures 116.

The first sub-wavelength structures 115 are configured to generate a first color. The second sub-wavelength structures 116 are configured to generate a second color. Each of the first sub-wavelength structures 115 and the second sub-wavelength structures 116 may be any sub-wavelength structure disclosed herein.

Each of the first and second facets 111, 112 defines a normal vector. The normal vector is orthogonal to the respective facet. The normal vector comprises a first orientation component and a second orientation component.

The first orientation component of the normal vector may represent a tilting of the facet relative to the x-y plane in the direction of the first axis (x-axis). The second orientation component of the normal vector may represent a tilting of the facet relative to the x-y plane in the direction of the second axis (y-axis).

Preferably, at least some, particularly preferably all, of the first facets 111 and of the second facets 112 are tilted relative to the x-y plane in the direction of the first axis. The first facets 111 may be tilted within a first angular range relative to the x-y plane in the direction of the first axis. The second facets 112 may be tilted within a second angular range relative to the x-y plane in the direction of the first axis.

In general, the normal vector may be a normal unit vector. A normal unit vector is a normal vector having a length of 1.

The first orientation components of the first facets 111 may be within a first range, for example from 0.4 to 0.6. The first orientation components of the second facets 112 may be within a second range, for example from −0.6 to −0.4. The first orientation components of the first facets 111 may have a negative value. The first orientation components of the second facets 112 may have a positive value.

A plurality of groups of facets may be arranged in the motif region. Facets of a facet group may have identical sub-wavelength structures and be tilted within an angular range relative to the x-y plane in the direction of the first axis. Facets of a facet group may have identical sub-wavelength structures, and first orientation components of the normal vectors of the facets may be within a range. The motif region may comprise at least 2, preferably at least 3, more preferably at least 5, more preferably at least 10, more preferably at least 15, more preferably at least 20, groups of facets.

By arranging first facets 111 with first sub-wavelength structures 115 in a tilt angle range and arranging second facets 112 with second sub-wavelength structures 116 in a different tilt angle range, it may be achieved that the color generated by the first sub-wavelength structures 115 is visible to the observer in a viewing angle range, and the color generated by the second sub-wavelength structures 116 is visible to the observer in another viewing angle range. Depending on the tilt angle of the security element 10, the observer may see different color impressions in the motif region 20.

At least some, preferably all, of the first facets 111 and of the second facets 112 may be tilted relative to the x-y plane in the direction of the second axis. Preferably, at least some, more preferably all, of the first facets 111 and of the second facets 112 are tilted relative to the x-y plane in the direction of the first axis and in the direction of the second axis.

By tilting the facets in the direction of the second axis, the depiction of the motif 30 may change depending on the viewing angle. In particular, the depiction of the motif 30 may be encoded in the tilting of the facets in the direction of the second axis, and the color impression of the motif may be encoded in the tilting of the facets in the direction of the first axis.

At least some, preferably all of the first facets 111 and the second facets 112 may be oriented non-parallel to the x-y plane.

One facet may be a surface of a microreflector, in particular a micromirror.

In FIG. 3a, first and second facets 111, 112 are arranged in different regions. Largely or exclusively first facets 111 are arranged in a first region. Largely or exclusively second facets 112 are arranged in a second region.

Each of the regions may be an area of at least 0.09 mm². Each of the regions preferably has an area of at least 0.25 mm², more preferably of at least 1 mm², more preferably of at least 4 mm², more preferably of at least 9 mm², more preferably of at least 16 mm², and more preferably of at least 25 mm². Each of the regions may be visible to an observer as an independent region.

By arranging first facets 111 in a first region and second facets 112 in a second region, the observer may see the visual impression caused by the first facets 111 in the first region, or see the visual impression caused by the second facets 112 in the second region, depending on the viewing angle.

Each of the regions may have an area less than 0.090 mm², preferably less than 0.040 mm², more preferably less than 0.010 mm², more preferably less than 0.0025 mm². None of the regions may be visible to the observer as an independent region. Regions with first facets and regions with second facets may be arranged alternately in the motif region, for example in a checkerboard pattern.

Figure 3B:
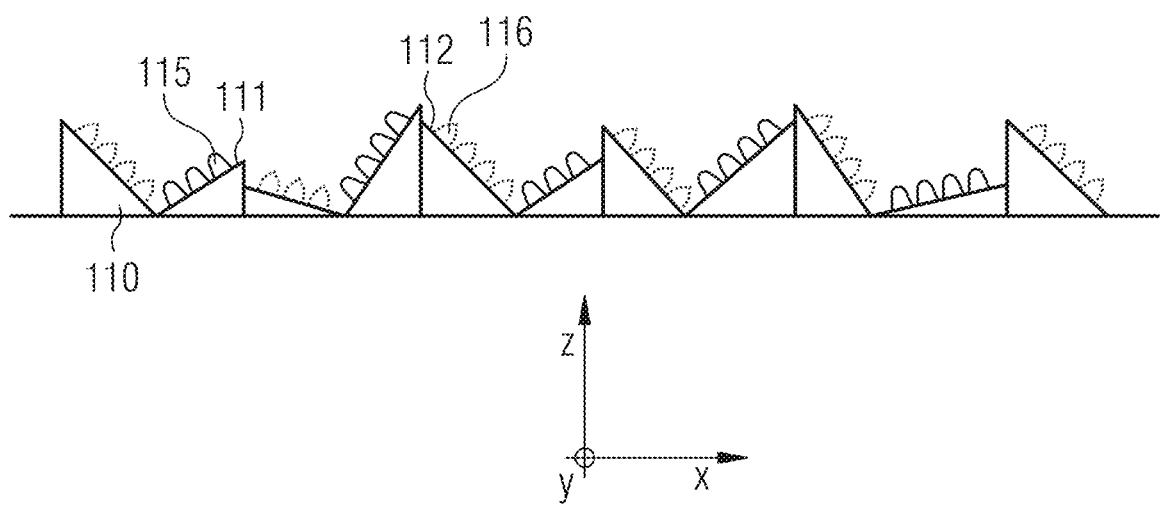
FIG. 3b shows an arrangement of first facets 111 and second facets 112.

As indicated in FIG. 3b, first and second facets 111, 112 may be nested in one another. First and second facets 111, 112 may be arranged in a substantially uniform distribution in one region. As a result, the visual impression caused by the first facets or the visual impression caused by the second facets may be visible to the observer in the region depending on the viewing angle.

Figure 4:
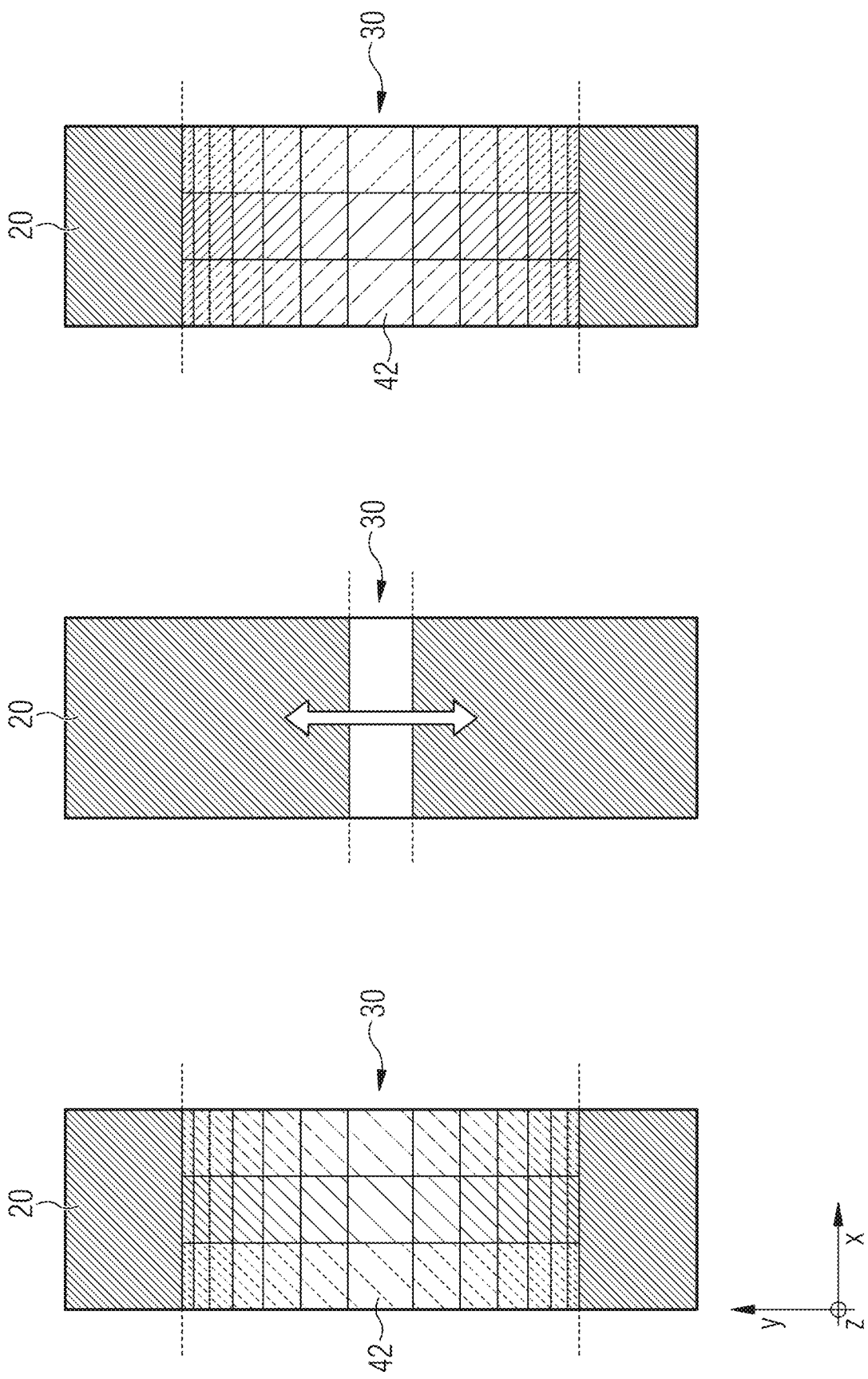
FIG. 4 shows on the left a motif region 20 with a motif 30 at a first viewing angle, on the right the motif region 20 with the motif 30 at a second viewing angle, and in the middle, a change of the motif 30 is indicated when the security element 10 is tilted about the first axis.

FIG. 4 shows a motif region 20 of a security element 10 at a first viewing angle on the left. FIG. 4 shows the motif region of the security element 10 at a second viewing angle on the right. By tilting the security element 10 about the second axis (y-axis or y-direction), a transition from the first viewing angle to the second viewing angle may take place.

In the middle, FIG. 4 illustrates a change of the motif 30 when the security element 10 is tilted about the first axis (x-axis or x-direction), for example from the first viewing angle to a third viewing angle or from the second viewing angle to a fourth viewing angle.

A motif 30 is visible to the observer in the motif region 20. The motif 30 is visible to the observer in a depiction and with a color impression. In FIG. 4, the motif 30 is shown between two dashed lines for better recognizability.

Similar to FIG. 2, the depiction of the motif 30 is a brightly illuminating section 42, which is visible to the observer in the motif region 20. The section 42 may be visible to the observer in the shape of a strip or rectangle. The motif 30 may be visible to the observer from one side of the motif region 20 up to an opposite side of the motif region 20. The motif 30 may be circular or square or have a different shape, in particular a geometric shape.

The color impression of the motif 30 of the example of FIG. 4 is visible to the observer as a color gradient. The color gradient may be visible to the observer in at least a section of the motif 30. In at least the section of the motif 30, no section may be visible to the observer with the same color. The color impression of the motif 30 may comprise a mixed color. The color gradient is indicated in FIG. 4 by different hatched lines. The color gradient may be continuous.

For example, facets with sub-wavelength structures, which generate primary colors (e.g. red, green and blue), may be arranged in the motif region 20. In this case, first facets with first sub-wavelength structures, second facets with second sub-wavelength structures and third facets with third sub-wavelength structures may be provided. The first, second and third sub-wavelength structures may each generate a basic color, e.g. red, green or blue.

The facets with the respective sub-wavelength structure may be arranged in the motif region 20 such that a color gradient is visible. The color gradient may be generated by at least two different sub-wavelength structures.

In the motif region 20, a mixed color may be visible in at least one section. The mixed color may be generated by first sub-wavelength structures and second sub-wavelength structures. The first sub-wavelength structures may generate a first color, in particular a first basic color. The second sub-wavelength structures may generate a second color, in particular a second basic color.

A facet may comprise the first and second sub-wavelength structures. The facet with the first and second sub-wavelength structures may generate a mixed color of the respective color generated by the first sub-wavelength structure or the second sub-wavelength structure. A plurality of such facets may be arranged in the motif region 20.

Preferably, first facets 111 comprise first sub-wavelength structures 115, and second facets 112 comprise second sub-wavelength structures 116. A first facet 111 and a second facet 112 may be arranged relative to one another in such a way that an observer may see a mixed color of the colors generated by the first and second sub-wavelength structures 111, 112. The distance between a first facet 111 and a second facet 112 may be less than 300 µm, preferably less than 150 µm, more preferably less than 100 µm, more preferably less than 50 µm. A plurality of the first facets 111 and a plurality of the second facets 112 are arranged in the motif region 20, in particular a plurality of the first facets 111 and a plurality of the second facets 112.

The color impression of the motif 30 changes for the observer when the security element 10 is tilted about the second axis. At the second viewing angle, the motif 30 is visible to the observer with a different color impression than at the first viewing angle. Preferably, the depiction of the motif 30 does not change when the security element 10 is tilted about the second axis.

The color impression of the motif 30 at the second viewing angle may be visible as the color gradient. The color gradient may be visible in at least one section of the motif 30. A section visible to the observer with a same color may be invisible to the observer in the motif 30. The color impression of the motif 30 may comprise a mixed color.

The change in the color impression of the motif 30 when the security element 10 is tilted about the second axis may be suddenly, abruptly and/or discontinuously visible to the observer. When the security element 10 is tilted about the second axis, a color flip effect may be visible to the observer.

As described with regard to FIG. 2, the depiction of the motif 30 may change when the security element is tilted about the first axis. This starts from the first viewing angle to a third viewing angle and starts from the second viewing angle to a fourth viewing angle. When the security element 10 is tilted about the first axis, the color impression of the motif 30 may not change. This is indicated in FIG. 2 by the double arrow in the middle image. The double arrow is not visible in the motif region 20; it serves merely for illustration.

Figure 5:
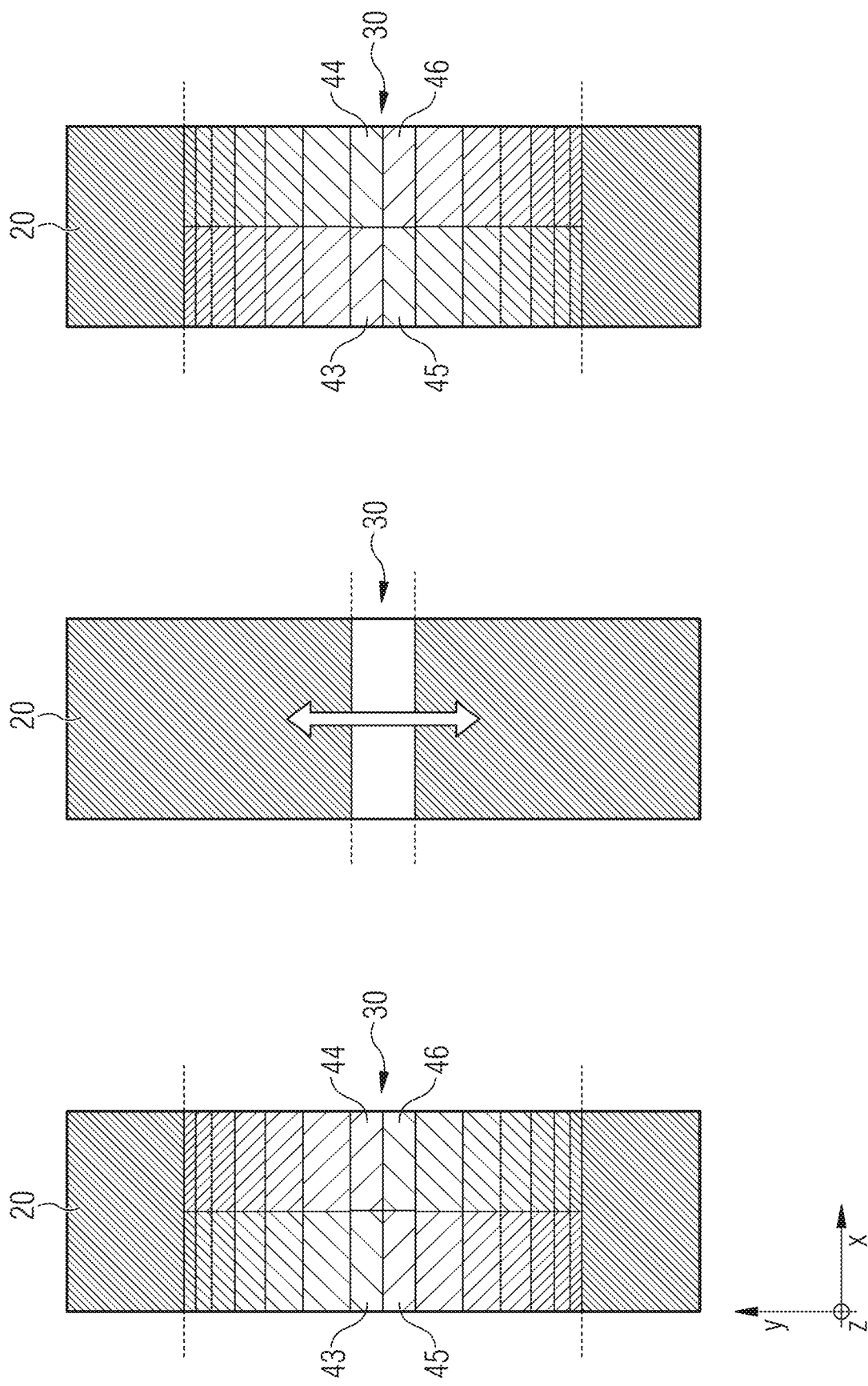
FIG. 5 shows on the left a motif region 20 with a motif 30 at a first viewing angle, on the right the motif region 20 with the motif 30 at a second viewing angle, and in the middle a change of the motif 30 is indicated when the security element 10 is tilted about the first axis.

FIG. 5 shows on the left a motif region 20 of a security element 10 at a first viewing angle. On the right in FIG. 5, the motif region 20 of the security element 10 is shown at a second viewing angle. A transition from the first viewing angle to the second viewing angle may take place by tilting the security element 10 about the second axis (y axis or y direction).

The illustration in the middle of FIG. 5 illustrates a change in motif 30 when the security element 10 is tilted about the first axis (x-axis or x-direction), for example from the first viewing angle to a third viewing angle or from the second viewing angle to a fourth viewing angle.

In the example of FIG. 5, the depiction of the motif 30 at the first viewing angle comprises a brightly illuminated section which comprises at least a first subregion 43 and at least a second subregion 44. The motif 30 is shown in FIG. 5 for better recognizability between two dashed lines.

The first subregion 43 may be visible to the observer at the first viewing angle in a first color. The second subregion 44 may be visible to the observer at the first viewing angle in a second color.

In general, a color may be a color generated by a sub-wavelength structure, a color generated by at least two sub-wavelength structures, in particular a mixed color, a color gradient or a color pattern.

When the security element 10 is tilted about the second axis, the color impression changes the motif 30.

Preferably, the first subregion 43 is visible by the observer at the second viewing angle in a color that is different from the first color. At the second viewing angle, the first subregion 43 may be visible to the observer in the second color.

The second subregion 44 may be visible to the observer at the second viewing angle in a color which is different from the second color. At the second viewing angle, the second subregion 44 may be visible to the observer in the first color.

The first subregion 43 and the second subregion 44 may (directly) adjoin one another. Alternatively, the first subregion 43 and the second subregion 44 may be spaced apart from one another.

At the first viewing angle, a third subregion 45 may be visible to the observer in a third color. At the second viewing angle, the third subregion 45 may be visible to the observer under a color which is different from the third color. In particular, the third subregion 45 is visible at the first viewing angle in the second color, and/or the third subregion 45 is visible at the second viewing angle in the first color.

The third subregion 45 may be visible to the observer (directly) adjacent to the first section 43. The third subregion 45 may be visible to the observer at a distance from the first and/or second subregion 44.

The motif 30 may comprise a fourth subregion 46. At the first viewing angle, the fourth subregion 46 may be visible to the observer in a fourth color. At the second viewing angle, the fourth subregion 46 may be visible to the observer in a color which is different from the fourth color. In particular, the fourth subregion 46 is visible at the first viewing angle in the first color, and/or the fourth subregion 46 is visible at the second viewing angle in the second color.

The fourth subregion 46 may be visible to the observer (directly) adjacent to the second section 44 and/or to the third section 45. The third subregion 45 may be visible to the observer at a distance from the first, second and/or third subregion 43, 44, 45.

The change of a color when the security element 10 is tilted about the second axis may be perceptible suddenly, abruptly and/or discontinuously by the observer (color flip effect).

Similar to as described above, the depiction of the motif 30 may change when the security element is tilted about the first axis. This starts from the first viewing angle to a third viewing angle and starts from the second viewing angle to a fourth viewing angle. The change in the depiction of motif 30 is indicated in FIG. 5 by the double arrow in the middle illustration. The double arrow is not visible in the motif region 20; it serves merely for illustration. When the security element 10 is tilted about the first axis, the color impression of the motif 30 may not change.

Preferably, when the security element 10 is tilted about the first axis, the position of the motif 30 changes. In addition, the size of the first, second, third and/or fourth subregions 43, 44, 45, 46 visible by the observer may change when the security element 10 is tilted about the first axis.

FIG. 6 shows on the left a motif region 20 of a security element 10 at a first viewing angle. FIG. 6 shows on the right the motif region of the security element 10 at a second viewing angle. By tilting the security element 10 about the second axis (y-axis or y-direction), a transition from the first viewing angle to the second viewing angle may take place. In FIG. 6, light and dark regions are shown inverted for purely illustrative reasons. Hatched regions may be brightly visible to the observer. Non-hatched regions may be darkly visible to the observer.

In the center, FIG. 6 illustrates a change in the motif 30 when the security element 10 is tilted about the first axis (x-axis or x-direction), for example from the first viewing angle to a third viewing angle or from the second viewing angle to a fourth viewing angle.

In the motif 30 of the example of FIG. 6, at least one first submotif 51 is visible to the observer. The first submotif 51 is visible at the first viewing angle in a first color. At the second viewing angle, the first submotif 51 is visible in a second color. When the security element 10 is tilted about the second axis, the color of the first motif 51 changes. The change in the color of the first motif 51 may be abrupt, sudden and/or discontinuous (color flip effect).

In addition, when the security element 10 is tilted about the second axis, the shape, position and/or size of the motif 51 may change. Preferably, the shape of the motif 51 changes when the security element 10 is tilted about the second axis.

In particular, the shapes of the submotif 51 are complementary to one another at the first viewing angle and at the second viewing angle. A section of the submotif 51 that seems bright at the first viewing angle may seem dark at the second viewing angle. A section of the motif 51 that seems bright at the second viewing angle may seem dark at the first viewing angle. Preferably, all sections of the submotif 51 which seem bright at the first viewing angle seem dark at the second viewing angle. Preferably, all sections of the submotif 51 which seem bright at the second viewing angle seem dark at the first viewing angle.

The change in the shape, position and/or size of the submotif 51 may be perceivable abruptly, suddenly and/or discontinuously by the observer. When the security element 10 is tilted about the second axis, the shape, position and/or size of the submotif 51 within a first angular range (tilt angle range) may not change or may remain the same. When the security element 10 is tilted beyond a limit angle, the shape, position and/or size of the motif may change (submotif flip). Within a second angular range, the shape, position and/or size of the motif 51 may not change or may remain the same. The limit angle may lie between the first and the second angular range.

The change in the color of the motif 51 and the change in the shape, position and/or size of the submotif 51 may be visible substantially simultaneously by the observer when the security element is tilted about the second axis beyond a limit angle. Alternatively, when the security element is tilted about the second axis beyond a first limit angle, the change in the color of the submotif 51 may be visible. When the security element is tilted about the second axis beyond a second limit angle, the change in the shape, position and/or size of the motif 51 may be visible. The first limit angle and the second limit angle may be spaced at least by 1°, preferably by at least 5°.

When the security element 10 is tilted about the first axis, the depiction of the motif 30 changes. When tilting about the first axis, the at least one submotif 51 may change its size, shape and/or position for the observer. This is indicated by the arrows in the middle illustration of FIG. 6. The arrows are not visible in the motif region; they serve merely for illustration. Preferably, the change in the size, shape and/or position of the submotif 51 when the security element 10 is tilted about the first axis is continuously perceptible by the observer. It is preferred that the size of the submotif 51 changes when tilting about the first axis. Particularly preferably, a pumping effect of the submotif 51 upon tilting is visible to the observer. The color impression of the motif preferably does not change when tilting about the first axis.

At least one second submotif 52 may be visible in the motif 30. When tilting about the first axis and/or about the second axis, the second submotif 52 may change the same as the first submotif 51. When the security element is tilted about the first axis in one direction, the size of the first submotif 51 preferably decreases, and the size of the second motif 52 increases. When the security element 10 is tilted about the first axis in the other direction, the size of the first submotif 51 may increase and the size of the second submotif 52 may decrease. In the motif 30, at least two first submotifs 51 and at least two second submotifs 52 may be visible to the observer.

On the left, FIG. 7 shows a motif region 20 of a security element 10 at a first viewing angle. On the right, FIG. 7 shows the motif region of the security element 10 at a second viewing angle. By tilting the security element 10 about the second axis (y-axis or y-direction), a transition from the first viewing angle to the second viewing angle may take place. Motifs 30 are shown between two dashed lines in FIG. 7 for better recognizability.

In the center, FIG. 7 illustrates a change in the motif 30 when the security element 10 is tilted about the first axis (x-axis or x-direction), for example from the first viewing angle to a third viewing angle or from the second viewing angle to a fourth viewing angle.

Similar to the example of FIG. 6, in the example of FIG. 7, at least one first submotif 51 is visible to the observer. The first submotif 51 is visible at the first viewing angle in a first color. At the second viewing angle, the first submotif 51 is visible in a second color. When the security element 10 is tilted about the second axis, the color of the first motif 51 changes. The change in the color of the first motif 51 may be abrupt, sudden and/or discontinuous (color flip effect).

In addition, when the security element 10 is tilted about the second axis, the shape, position and/or size of the motif 51 may change. Preferably, the shape and the position of the motif 51 change when the security element 10 is tilted about the second axis. For example, the submotif 51 at the first viewing angle is a fish at a first position and, at the second viewing angle, the motif 51 is a bird at a second position.

A section of the submotif 51 that seems bright at the first viewing angle may seem dark at the second viewing angle. A section of the motif 51 that seems bright at the second viewing angle may seem dark at the first viewing angle. Preferably, all sections of the submotif 51 which seem bright at the first viewing angle seem dark at the second viewing angle. Preferably, all sections of the submotif 51 which seem bright at the second viewing angle seem dark at the first viewing angle.

The submotif 51 may exhibit a submotif flip as described with regard to FIG. 6.

When the security element 10 is tilted about the first axis, the depiction of the motif 30 changes. This is indicated in the middle illustration of FIG. 7 by the double arrow. The motif 30 may be a brightly illuminated section. The brightly illuminated section may comprise several subsections. When tilting about the first axis, the size, shape and/or position of the motif 30 may change for the observer. Preferably, the change in the size, shape and/or position of the motif 30 when the security element 10 is tilted about the first axis is continuously perceptible by the observer. It is preferred that the motif 30 moves upward or downward for the observer when the security element is tilted about the first axis.

At least one second submotif 52 may be visible in the motif 30. When tilting about the first axis and/or about the second axis, the second submotif 52 may change the same as the first submotif 51. The second submotif 52 may be visible to the observer at the first viewing angle and/or at the second viewing angle at a distance from the first submotif 51.

In the motif region 20, at least two, preferably at least three, more preferably at least four motifs 30 may be visible to the observer.

On the left, FIG. 8 shows a motif region 20 of a security element 10 at a first viewing angle.

At the first viewing angle, a motif 30 in the motif region 20 is visible to the observer. The motif may be a brightly illuminated section with a first subregion 43 and a second subregion 44. The first subregion 43 and the second subregion 44 may be visible to the observer in such a way that the brightly illuminated section is strip-shaped or rectangular in the motif region. The motif 30 in FIG. 8 is shown for better recognizability between two dashed lines.

The first subregion 43 may be visible to the observer in a first color. The second subregion 44 may be visible to the observer in a second color. Each of the colors may be a color generated by a sub-wavelength structure, a color generated by at least two sub-wavelength structures, in particular a mixed color, or a color gradient.

The color impression of the motif 30 may be at least partially defined by the first subregion 43 and the second subregion 44.

When the security element 10 is tilted about the second axis, the position of the first subregion 43 may change. Preferably, the first subregion 43 may be visible to the observer at the first viewing angle at a first position and, at the second viewing angle (middle illustration of FIG. 8), the first subregion 43 may be visible to the observer at a second position.

A change in the position of the first subregion 43 may be perceptible to the observer suddenly, abruptly and/or discontinuously by the observer when the security element 10 is tilted about the second axis.

When the position of the first subregion 43 changes, a position, shape and/or size of the motif 30 may not change or may remain the same. Preferably, when the position of the first subregion 43 changes, the size of the first subregion 43 does not change.

When the position of the first subregion 43 changes, the shape and/or position of the second subregion 44 may change. In particular, the second subregion 44 may be visible at the first viewing angle as a contiguous subregion.

At the second viewing angle, the second subregion 44 may be visible to the observer with a first section 44a and a second section 44b. The first section 44a and the second section 44b may be visible to the observer spaced apart from one another or non-contiguously. The first section 44a and the second section 44b may be spaced apart by the first subregion 43. Between the first section 44a and the second section 44b of the second subregion 44, the first section 43 may be visible to the observer.

When the security element 10 is tilted about the second axis, it may seem to the observer as if the first subregion 43 were moving within the motif 30, in particular at least partially within the second subregion 44. The movement may seem discontinuous or continuous to the observer.

At the third viewing angle (right illustration of FIG. 8), the first subregion 43 may be visible to the observer at a third position. When the security element 10 is tilted further starting from the second viewing angle about the second axis, the position of the first subregion 43 may change (further).

The second subregion 44 may be contiguously visible to the observer at the third viewing angle.

In particular, when the security element 10 is tilted about the second axis, it may seem to the observer as if the first subregion 43 were moving from one side of the motif region 20 to another side of the motif region 20, preferably to an opposite side of the motif region 20.

When the security element 10 is tilted about the first axis, the depiction of the motif 30 changes. The position, the shape and/or the size of the motif 30 may change during the tilting. The change in the depiction of the motif 30 may be perceived as continuous by the observer.

Preferably, when the security element 10 is tilted about the first axis, the position of the motif 30 changes. For example, the motif 30 (depending on the tilting direction) may be visible to the observer as moving up or down, wherein in particular the shape and/or the size of the motif 30 does not change.

The change in the position of the motif 30 in the motif region 20 is indicated in the illustrations of FIG. 8 by the respective double arrow. The double arrows are not visible to the observer in the motif region 20.

The invention claimed is:

1. An optically variable security element with a motif region, wherein:
    (a) a plurality of differently oriented first facets and a plurality of differently oriented second facets are arranged in the motif region, wherein each of the first and second facets defines a normal vector with a first orientation component in a direction of a first axis and a second orientation component in a direction of a second axis which is not parallel to the first axis, and wherein the optically variable security element defines an x-y plane;
    (b) the first facets comprise first sub-wavelength structures and the second facets comprise second sub-wavelength structures, wherein the first sub-wavelength structures are different from the second sub-wavelength structures;
    (c) in the motif region, at least one motif is visible to an observer in a depiction and with a color impression;
    (d) the depiction of the at least one motif changes for the observer as the optically variable security element is tilted about the first axis; and
    (e) the color impression of the at least one motif changes for the observer as the optically variable security element is tilted about the second axis
    wherein
    (f) the color impression of the at least one motif is determined by the first orientation components, and the depiction of the at least one motif is determined by the second orientation components;
    (g) the first orientation components of the first facets and the second facets are different from one another; and
    (h) at least some of the first and second facets are tilted in the direction of the first axis and in the direction of the second axis.

2. The optically variable security element according to claim 1, wherein the first and second sub-wavelength structures each have a color effect,
    wherein the color effect is substantially independent of a tilting of the optically variable security element about the first axis and/or about the second axis.

3. The optically variable security element according to claim 1, wherein the sub-wavelength structures:
    have dimensions equal to or greater than a quarter of a wavelength of visible light; and/or
    are periodic structures, with a period between 100 nm and 500 nm; and/or
    have a depth between 50 nm and 400 nm; and/or
    are one-dimensional gratings, wherein the one-dimensional gratings have a polarizing effect or are two-dimensional gratings, with rectangular, square, hexagonal or parallelogram-shaped recesses; and/or
    are wave-shaped in a cross-section, sinusoidal, sawtooth-shaped, rectangular, with high-lying and low-lying sections, with concave and/or convex sections; and/or
    comprise an arrangement, a periodic arrangement, of nanoholes or nanodots; and/or
    are irregularly arranged structures, randomly distributed or quasi-periodically arranged structures; and/or
    are concave-convex structures, irregularly distributed concave-convex structures having flat sections; and/or
    are formed in an embossed layer, wherein the embossed layer is a film, a thermoplastic film, or a radiation-cured varnish, a UV radiation-cured varnish; and/or
    are metalized with Al, Ag, Cr, Cu, Fe or an alloy thereof; and/or
    comprise an HRI layer comprising ZnS; and/or
    comprise a multi-layered layer, wherein the multi-layered layer comprises an absorber layer, a dielectric layer and a reflective layer, or
    wherein the multi-layered layer comprises an absorber layer, a dielectric layer and an absorber layer; and/or
    are embedded in a layer; and/or
    comprise a continuous layer, wherein the sub-wavelength structures comprise high and low sections, and the high and low sections comprise a layer; and/or
    comprise a layer which is continuous in a view perpendicular to the x-y plane.

4. The optically variable security element according to claim 1, wherein the color impression of the at least one motif is constant for the observer as the optically variable security element is tilted about the second axis within a tilt angle range.

5. The optically variable security element according to claim 1, wherein the depiction of the at least one motif is constant for the observer as the optically variable security element is tilted about the second axis within a first viewing angle range, and/or
    wherein the color impression of the at least one motif is constant for the observer as the optically variable security element is tilted about the first axis within a second viewing angle range.

6. The optically variable security element according to claim 1, wherein the first and second facets are arranged in the motif region such that at least one section of the at least one motif is visible to the observer in one color,
   wherein the section of the at least one motif has a dimension of at least 300 µm.

7. The optically variable security element according to claim 1, wherein the depiction of the at least one motif comprises a size, a position and/or a shape of the at least one motif.

8. The optically variable security element according to claim 1, wherein at least a section of the at least one motif is visible to the observer at a first viewing angle in a first color, and the section of the at least one motif is visible to the observer at a second viewing angle in a second color.

9. The optically variable security element according to claim 1, wherein a first color gradient is visible to the observer in at least one section of the at least one motif at a first viewing angle, and a second color gradient is visible in the section of the at least one motif at a second viewing angle.

10. The optically variable security element according to claim 1, wherein the at least one motif comprises at least one first subregion and at least one second subregion,
   wherein the first subregion is visible to the observer at a first viewing angle in a first color impression, and the second subregion is visible to the observer at the first viewing angle in a second color impression, wherein the first subregion is visible to the observer at a second viewing angle in the second color impression, and the second subregion is visible to the observer at the second viewing angle in the first color impression.

11. The optically variable security element according to claim 1, wherein at least one submotif is visible to the observer in the at least one motif,
   wherein the submotif changes for the observer as the optically variable security element is tilted about the first axis, wherein a size, a shape and/or a position of the at least one submotif changes.

12. The optically variable security element according to claim 1, wherein the color impression and the depiction of the at least one motif are changed for the observer as the optically variable security element is tilted about the second axis, wherein at least one first submotif is visible to the observer in the at least one motif,
   wherein a color impression of the submotif and/or a shape of the submotif changes as the optically variable security element is tilted about the second axis.

13. The optically variable security element according to claim 1, wherein the at least one motif comprises at least a first subregion which is visible to the observer in a first color impression, and the at least one motif comprises at least one second subregion which is visible to the observer in a second color impression,
   wherein as the optically variable security element is tilted about the second axis, a change in the first subregion and/or the second subregion is visible to the observer, wherein a change in a size, a shape and/or a position of the first subregion and/or the second subregion is visible to the observer.

14. The optically variable security element according to claim 1, wherein the first and second facets each are a surface of a microreflector.

15. A value document having an optically variable security element according to claim 1.

* * * * *